United States Patent
Kline et al.

(10) Patent No.: US 7,127,480 B2
(45) Date of Patent: Oct. 24, 2006

(54) SYSTEM, METHOD AND PROGRAM FOR BACKING UP A COMPUTER PROGRAM

(75) Inventors: Christopher N. Kline, Firestone, CO (US); Chad Dale Lingmann, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 10/728,487

(22) Filed: Dec. 4, 2003

(65) Prior Publication Data

US 2005/0125464 A1    Jun. 9, 2005

(51) Int. Cl.
*G06F 13/00* (2006.01)
*G06F 12/00* (2006.01)

(52) U.S. Cl. .......................... 707/204; 711/162; 714/6; 718/101; 719/314

(58) Field of Classification Search ............... 719/314, 719/327; 718/100, 101; 707/204; 714/6, 714/710; 711/162, 163; 710/200
See application file for complete search history.

(56) References Cited

U.S. PATENT DOCUMENTS

| | | | | |
|---|---|---|---|---|
| 5,367,635 | A | 11/1994 | Bauer et al. ................. | 395/200 |
| 5,996,012 | A | 11/1999 | Jarriel ......................... | 709/226 |
| 6,292,790 | B1 | 9/2001 | Krahn et al. ................. | 705/50 |
| 6,349,304 | B1 | 2/2002 | Boldt et al. ................. | 707/102 |
| 6,516,347 | B1 | 2/2003 | Nakamura .................. | 709/221 |
| 6,567,849 | B1 | 5/2003 | Ludovici et al. ............ | 709/223 |
| 6,615,166 | B1 | 9/2003 | Guheen et al. .............. | 703/27 |
| 6,697,866 | B1 * | 2/2004 | Arakawa et al. ............ | 709/229 |
| 6,728,751 | B1 * | 4/2004 | Cato et al. ................... | 709/202 |
| 2003/0046442 | A1 | 3/2003 | Maryka et al. ............. | 709/316 |
| 2003/0145061 | A1 | 7/2003 | Kochiya ..................... | 709/208 |
| 2003/0204597 | A1 * | 10/2003 | Arakawa et al. ............ | 709/226 |
| 2003/0212736 | A1 * | 11/2003 | Kotnur et al. .............. | 709/202 |
| 2004/0073835 | A1 * | 4/2004 | Kim ............................ | 714/13 |
| 2004/0103079 | A1 * | 5/2004 | Tokusho et al. ............... | 707/1 |
| 2004/0205206 | A1 * | 10/2004 | Naik et al. .................. | 709/230 |
| 2004/0215998 | A1 * | 10/2004 | Buxton et al. ................ | 714/2 |
| 2004/0250162 | A1 * | 12/2004 | Halley et al. ................ | 714/13 |
| 2005/0010709 | A1 * | 1/2005 | Davies et al. ............... | 710/305 |

* cited by examiner

*Primary Examiner*—Hong Kim
(74) *Attorney, Agent, or Firm*—Arthur J. Samodovitz

(57) ABSTRACT

A system and computer program product for backing up a program and a plurality of user instances of the program. First program instructions backup definitions of queues used by the program instances. Second program instructions backup authorizations for the queues. Third program instructions backup a plurality of program-instance configuration files for the plurality of program instances, respectively. Fourth program instructions backup a configuration file for the program. Also disclosed is a method and program product for backing up a user program instance which has locked a queue definition file containing definitions of queues and authorizations for accessing the queues, and which has not locked a configuration file identifying the user program instance. A backup program queries the user program instance for the definitions of the queues and the authorizations for the queues such that the user program instance retains the lock on the queue definition file. In response, the user program reads the definitions and authorizations from the queue definition file and furnishes them to the backup program. The backup program directly reads the configuration file without querying the user program for the configuration file and without locking the configuration file.

14 Claims, 4 Drawing Sheets

SYSTEM, METHOD AND PROGRAM FOR BACKING UP A COMPUTER PROGRAM

CROSS REFERENCE TO RELATED APPLICATIONS

This application is related to END920030058US1, assigned U.S. patent application Ser. No. 10/635,397, entitled "Method, Apparatus and Program Storage Device for Scheduling the Performance of Maintenance Tasks to Maintain a System Environment" Ser. No. 10/635,397 filed by Christopher N. Kline et al. on Aug. 6, 2003.

BACKGROUND OF THE INVENTION

The invention relates generally to computer systems, and deals more particularly with a technique to back-up a computer program.

There are various types of computer programs today, such as operating systems, middleware and applications. A middleware program acts as an interface between two applications (typically on other servers) to facilitate communication of data between the two servers. Middleware assists the communication when the two applications have different communication protocols or are otherwise not suited for direct communication with each other. One example of middleware is IBM MQ Series (which is also known as IBM Websphere MQ) program which establishes an asynchronous message-queuing service to enable communication of messages between two or more other applications which differ in type from each other. The IBM MQ Series/Websphere MQ program manages the I/O to these other applications, establishes message queues, manages authorizations to the message queues, and maintains configuration files and user exits. The authorizations indicate which applications are authorized to add messages to and remove messages from each message queue. The configuration files specify log parameters, network parameters, memory settings, queue settings, and names of application-instance (for example, queue manager) configuration files. Examples of log parameters are logging type (linear or circular), log size, log buffers, and primary/secondary log allocation. Examples of network parameters are TCP keep-alives, and channel-connection settings. The queue settings specify the permitted length of each message queue, whether the messages on the queue should persist after a restart, how large each individual message can be, whether the queue is part of a cluster of queues, and whether an external application should be triggered to retrieve the message upon arrival to the queue. "User exits" are read-only, custom code such as code to provide security checking when an application requests to remove a message from a work queue. Other exits might be used to encrypt or compress messages. Some of the objects, such as a queue object that defines the queue, may be locked when "opened" for use by an external application.

An operator of the middleware program may change the configuration files as needed for proper operation of the middleware. It is prudent to occasionally backup the configuration files, queue objects, authorization tables and other files of the middleware program in case there is a system failure which deletes or corrupts them. It is not necessary to backup the basic middleware program code, because the basic code can be obtained, if needed, from a stagnant disk. In the case of a message-queuing middleware program, the messages on the queue are not generally backed up because they are too transient. External applications can backup and control such data, if desired. However, other types of data objects in other types of programs may be backed up. The backup of the configuration files, queue objects, authorization tables in IBM MQ Series/Websphere MQ program is currently performed as follows: An MQSeries application instance (for example, a queue manager) is stopped in order to release all locked files and provide for a consistent backup, which is then performed by an external backup program. Alternatively, the queue manager can be left running (and thus, needed repository files are locked in use), and a tool can be used to query the queue manager for settings that need to be saved. Such settings include objects, such as queues, channels, processes, and security objects. They also include the authorizations to those objects (such as the authorizations for an application to connect to a queue to contribute or retrieve a message). Each of these objects has authorizations (otherwise called permissions) that determine which ids and groups are permitted to access the object. The entire system, including the authorizations settings (which are not part of the objects themselves), was backed up by stopping the instance and relinquishing the lock. Then an "offline" filesystem backup was performed of all files in the repository. Most MQSeries installations keep repository files at the /var/mqm/qmgrs location on UNIX machines. The offline filesystem backup comprised the steps of 1) stopping external applications, and thus disconnecting their connections to MQSeries middleware, 2) stopping MQSeries middleware instances (queue managers), 3) an external storage program such as IBM Tivoli Storage Manager (TSM) is used to backup the /var/mqm and /var/mqm/log filesystems (which comprise the whole of MQSeries data files), 4) MQSeries is restarted, 5) external applications are restarted. The /var/mqm/ filesystem contains the repositories for each of the queue managers. This includes the objects and their associated permissions. That filesystem also contains message exits and all necessary configuration files. The /var/mqm/log filesystem was also backed up to provide recovery for the data in the queues. The whole filesystem was backed up, and users were then left to determine which files would be necessary to recover should a "restore" be needed.

One problem with a known backup process is that the middleware program is shut down during the backup. It is also known in other environments for a program which owns a lock to a repository to relinquish the lock to another program which needs to access the repository. However, for some programs such as IBM MQ Series/Websphere MQ program, the repository is essential to operation, and without the lock the proogram will be precluded from performing most tasks (until the lock is regained). Another problem was that even if a tool was used to backup the objects while the instance was running, the authorizations for those objects were not backed up (because they are stored separately) and thus the backup presented only a portion of the configuration settings necessary to completely recreate the instance.

A general object of the present invention is to facilitate the process of backing up a middleware program or other program.

Another object of the present invention is to permit backup of configuration files and other files of a middleware program or other program, without interfering with operation of the middleware program or other program.

Another object of the present invention is to facilitate backup of a comprehensive collection of information relating to the configuration of the queues.

SUMMARY OF THE INVENTION

The invention resides in a system and computer program product for backing up a program and a plurality of user instances of the program. First, program instructions backup definitions of queues used by the program instances. Second, program instructions backup authorizations for the queues. Third, program instructions backup a plurality of program-instance configuration files for the plurality of program instances, respectively. Fourth, program instructions backup a configuration file for the program.

In accordance with various features of the present invention, the queues are message queues. Fifth, program instructions backup user exits for the program and program instances. The first program instructions request the definitions of the queues from a program instance, and the second program instructions request the authorizations from the program instance. The first, second, third and fourth program instructions are executed as a continuous program flow such that the backups are substantially consistent with each other. The program can be a middleware program.

The invention also resides in a method for backing up a user program instance which has locked a queue definition file containing definitions of queues and authorizations for accessing the queues, and which has not locked a configuration file identifying the user program instance. A backup program queries the user program instance for the definitions of the queues and the authorizations for the queues such that the user program instance retains the lock on the queue definition file. In response, the user program reads the definitions and authorizations from the queue definition file and furnishes them to the backup program. The backup program directly reads the configuration file without querying the user program for the configuration file and without locking the configuration file.

DETAILED DESCRIPTION OF THE PREFERRED EMBODIMENTS OF THE PRESENT INVENTION

Figure 1:
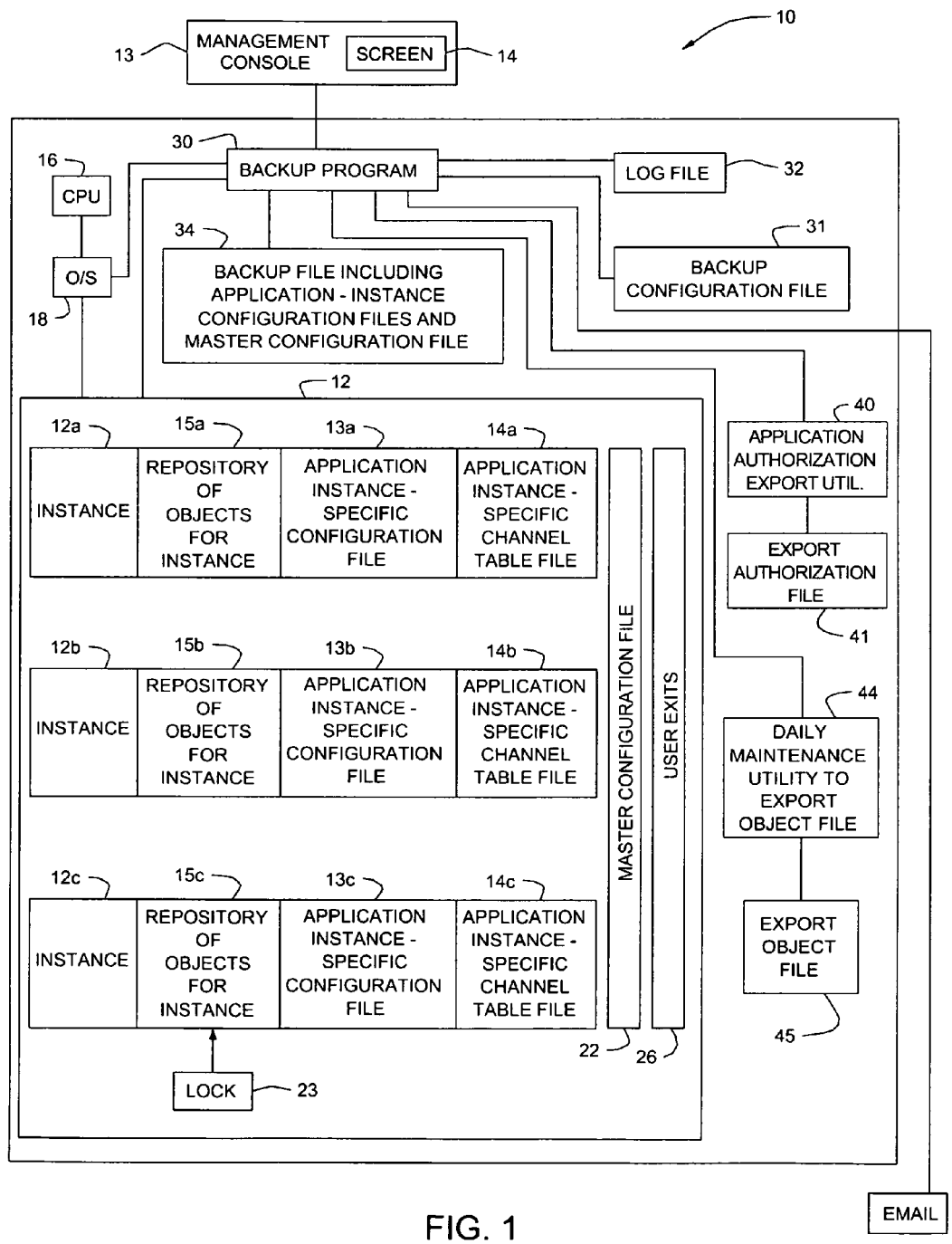
FIG. 1 is a block diagram of a computer system which includes a backup program according to the present invention.

An embodiment of the present invention will now be described in detail with reference to the figures. FIG. 1 illustrates a computer system generally designated 10 which comprises a computer 11 and a console 13 with a display screen 14. Computer 11 comprises a CPU 16, an operating system 18 and an application 12. By way of example, application 12 is a middleware program such as IBM MQ Series/Websphere MQ program, but could be a wide variety of other programs as well. Multiple instances 12a,b,c of program 12 have been created. Each instance of application 12 is a copy of application 12 which executes as a separate process with a separate configuration defined by respective configuration files 13a,b,c. Each application instance 12a, b,c has its own application-instance configuration file 13a, b,c which specifies transaction log settings for the application instance, locations of exits, authorization settings, performance tuning settings regarding networks and protocols, etc. Each application instance 12a,b,c also has its own application-instance channel-table file 14a,b,c, respectively, which specifies parameters for communication/connection that are used by other applications to communicate/connect with the application instance. Application 12 created the application-instance configuration files at the time the application instance was created. The values for the parameters for the application-instance configuration files were specified by an operator of application 12, and embedded in application 12 when a "create new instance" command was issued to application 12. Upon installation, a master configuration file 22 was created. The operator is then free to modify the master configuration file as needed. The operator can also create and install user exits 26 for application 12 and its instances 12a,b,c. The master configuration file specifies the name of each application instance, the location of each application-instance and/or the application-instance configuration file, global defaults for each application instance if not otherwise specified, etc. A backup program 30 according to the present invention is also running in computer 10. As described in more detail below, the function of backup program 30 is to periodically or occasionally initiate the backup of application-instance objects (such as queues, channels, processes, etc.), backup master configuration file 22, backup application-instance configuration files, initiate export of authorizations from each application instance, backup channel table files 14a,b,c, and user exits 26 to a backup file 34. A prior art application-authorization export program 40 is running in computer 10 to export the authorizations for each object in a designated application instance to an executable text file 41 that can be used to reload the authorizations when needed. The export program 40 obtains the authorization information by querying the application instances. A daily maintenance program 44, as described in U.S. patent application "Method, Apparatus and Program Storage Device for Scheduling the Performance of Maintenance Tasks to Maintain a System Environment" Ser. No. 10/635,397 filed by Chris Kline on Aug. 6, 2003, is also running in computer 10 to export queue objects, such as definitions of the message queues, created by program 12 to an object file 45. The daily maintenance program 44 obtains the queue objects by querying the respective application instances.

Figure 2:
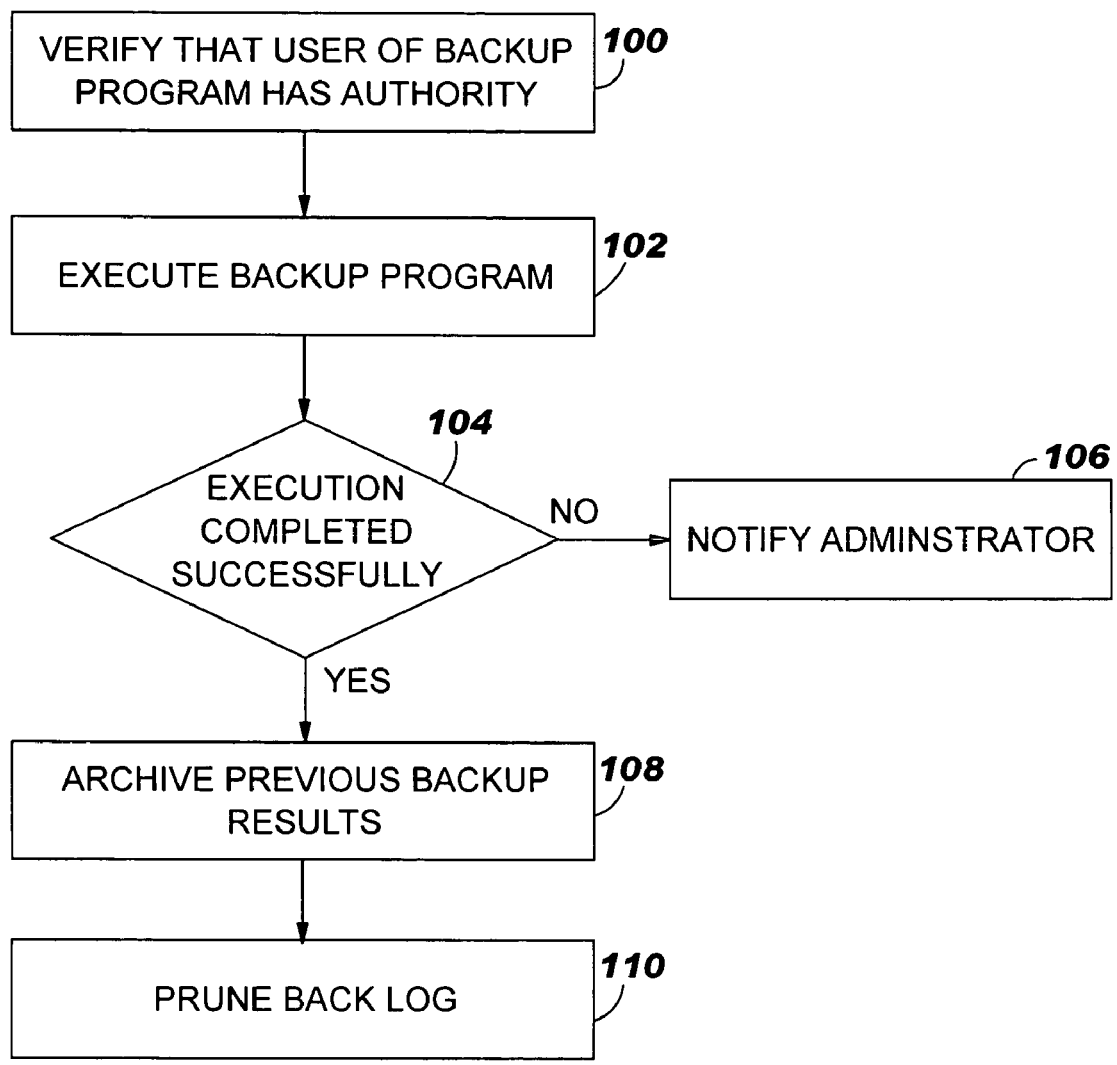
FIG. 2 is a flow chart of a backup process for the computer system of FIG. 1, which process includes the backup program.

FIG. 2 is a flow chart illustrating the process of backing up program 12 using backup program 30. Initially, backup program 30 verifies that the current operator/user of the backup program has proper authority to access the application instances for which backup is requested. Typically, the current operator/user is the "owner" of the application instances and therefore has authority to access anything that the application instances can access, including the configuration files (step 100). If so, the operator initiates backup program 30 to perform a backup for the application instances (step 102). Backup program 30 includes its own configuration file which indicates which files to backup, either by copying an existing file or by querying the application instances for the information necessary to create a new copy of the file. In the illustrated example, the existing files which are copied are the master configuration file 22, application-instance channel-table files 13a,b,c, application-instance configuration files 14a,b,c, and user exits 26. In the illustrated example, the backup program queries the application instances for the configured objects (for queues, channels, etc.) 15a,b,c and application-instance authorizations instead of reading them from repository 15a,b,c because the repository 15a,b,c may be locked by the respective application instance. In response to the query from the backup program, the application instance will read the objects and object authorizations from the respective repository 15a,b,c in order to supply them to the backup program. However, because the respective application instance holds the lock, it can manage the access to supply a consistent snapshot of the objects and object authorizations, and will not have to relinquish the lock 23. By keeping the lock, the respective application instance can optimize its operations. The backup operation is described in more detail below with reference to FIG. 3. If there is an error in the backup operation (decision 104, no branch), then the backup program notifies an administrator (step 106). However, if the backup operation is successfully completed (decision 104, yes branch), it results in a copy of the backed-up files in backup file 34, authorization file 41 and object file 45. After the backup, backup program 30 also deletes the oldest copy of the backed-up files to free-up storage, if the maximum number of backup files is reached (step 108). Backup program 30 also logs its own activity/states in log file 32 logs in case there is a problem with the backup. After step 108, backup program 30 deletes from the log file 32 entries for old backup operations to free-up storage, should the file be too large (step 110).

Figure 3:
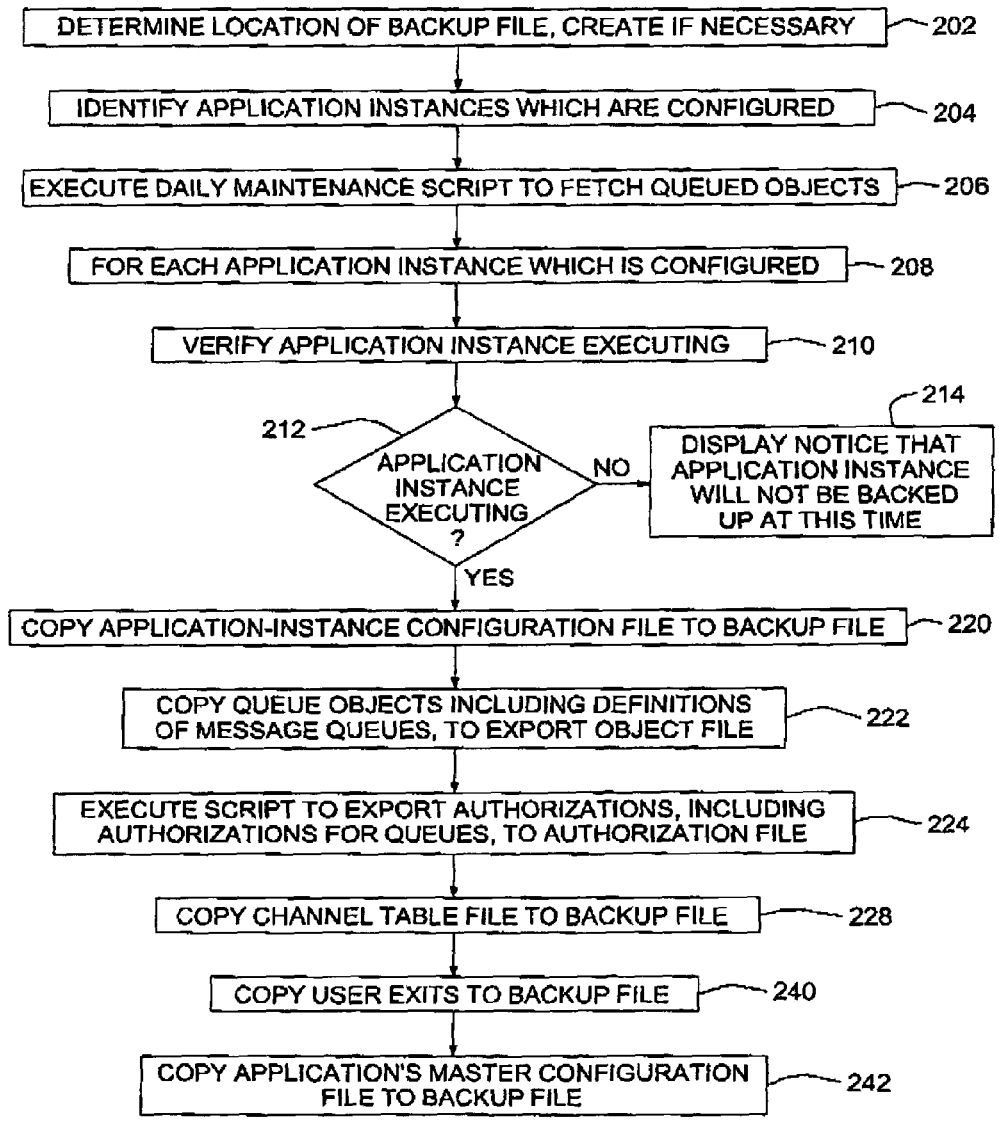
FIG. 3 is a more detailed flow chart of the backup program of FIG. 1.

FIG. 3 is a flow chart illustrating in more detail step 102 of FIG. 2, i.e. the function and operation of backup program 30 during the backup process. Initially, backup program 30 determines from a directory (i.e. path indicator) the location of backup file 34, to where much of the information to be backed up will be stored (step 202). If there is no directory/path to the backup file 34, then backup program 30 determines the location of the backup file 34 from a backup configuration file 31, and creates a directory for the backup file. Next, backup program 30 identifies all of the instances of application 12 that are currently configured by searching the master configuration file 22 which lists all the application instances and their locations (step 204). Next, backup program 30 executes daily maintenance script 44 which creates an export file of the objects created by each instance of program 12 (step 206). The daily maintenance script 44 obtains the objects by querying the application instances for a list of their objects. The application instances obtain the objects for the daily maintenance script by reading them from the respective repository 15a,b,c. The daily maintenance script 44 is further described in U.S. patent application "Method, Apparatus and Program Storage Device for Scheduling the Performance of Maintenance Tasks to Maintain a System Environment" Ser. No. 10/635,397 filed by Chris Kline on Aug. 6, 2003, which patent application is hereby incorporated by reference as part of the present disclosure. Because the daily maintenance script 44 obtains the objects by querying the application instances, the daily maintenance script 44 need not stop or suspend operation of the application instances. (If instead, the daily maintenance script 44 copied the objects from object files 15a,b,c used by the application instances, then the daily maintenance script 44 would need to obtain the lock from the application instances or otherwise halt or suspend execution of the application instances to avoid contention for the object files 15a,b,c. This could impact other applications as well that depend on the application instances 12a,b,c.)

Next, backup program 30 performs the following steps 208–228 for each instance of application 12 identified in step 204 as being configured (loop control step 208). Backup program 30 determines if the application instance is currently executing by querying the operating system. If the operating system responds that the application instance is currently executing, backup program 30 attempts to confirm this by pinging the application instance (for example, using a "runmqsc" command when querying IBM MQ Series/Websphere MQ program) or sending a request to the application instance (step 210). (Neither the nature of the request nor the substance of the response is important, just that the application instance responds to indicate that the application instance is currently executing.) If the application instance is not currently executing (decision 212, no branch), then backup program 30 displays an error message that the application instance will not be backed up at this time (step 214). However, if the application instance is currently executing (decision 212, yes branch), then backup program 30 copies the respective application-instance configuration file 13a,b or c to the backup file 34 (step 220). Then, backup program 30 copies into the backup file the exported-object file 45 with the object definitions collected in step 206 (step 222). Next, backup program 30 executes the object-authorization export script program to export the application-instance authorizations to authorization file 41 (step 224). The backup program 30 obtains the application-instance authorizations by querying the application instance instead of reading them directly from the repository 15a,b,c. Because backup program 30 obtains the authorizations by querying the application instance instead of copying them directly from repository 15a,b,c used by the application instance, the backup program will not halt or suspend execution of the application instance during backup of the authorizations. Next, backup program 30 copies the channel-table file 14a,b, or c for the application instance to the backup file 34 (step 228). The channel table files 14a,b,c are "read-only" and not locked. This will not interfere with execution of the application instances because the channel table files 14a,b,c will not be locked by the backup program.

After completing the foregoing steps 208–228 for each instance of application 12, backup program 30 copies the user exits 26 to the backup file directory (step 240). The "user exits" are read-only, custom code such as code to provide security checking when an application requests to remove a message from a work queue. They may also be used to perform custom encryption or compression functions. In the illustrated embodiment, the user exits 26 are not locked (because they are "read-only") and can be used by the application 12 and its instances 12a,b,c. Copying of a user exit 26 by backup program 30 will not interfere with execution of the application instances because the user exits are not locked by the backup program 30. Next, backup program 30 copies the master configuration file 22 for application 12 to the backup file 34 (step 242). In the illustrated embodiment, the master configuration file 22 is "read-only" and is not locked. Copying of this file will not interfere with execution of the application instances because the master configuration file is not locked by the backup program 30. In the preferred embodiment of the present invention, the steps of FIG. 3 are executed as a continuous program flow (although the order of the backups is not critical), and will typically be completed in less than two seconds (in addition to any time required for the aforementioned object and authorization export utilities executed externally) for a typical size and complexity system. Because the items being backed up do not change frequently, the backup will usually present a snapshot or consistent image of the backed up items at a moment in time.

Figure 4:
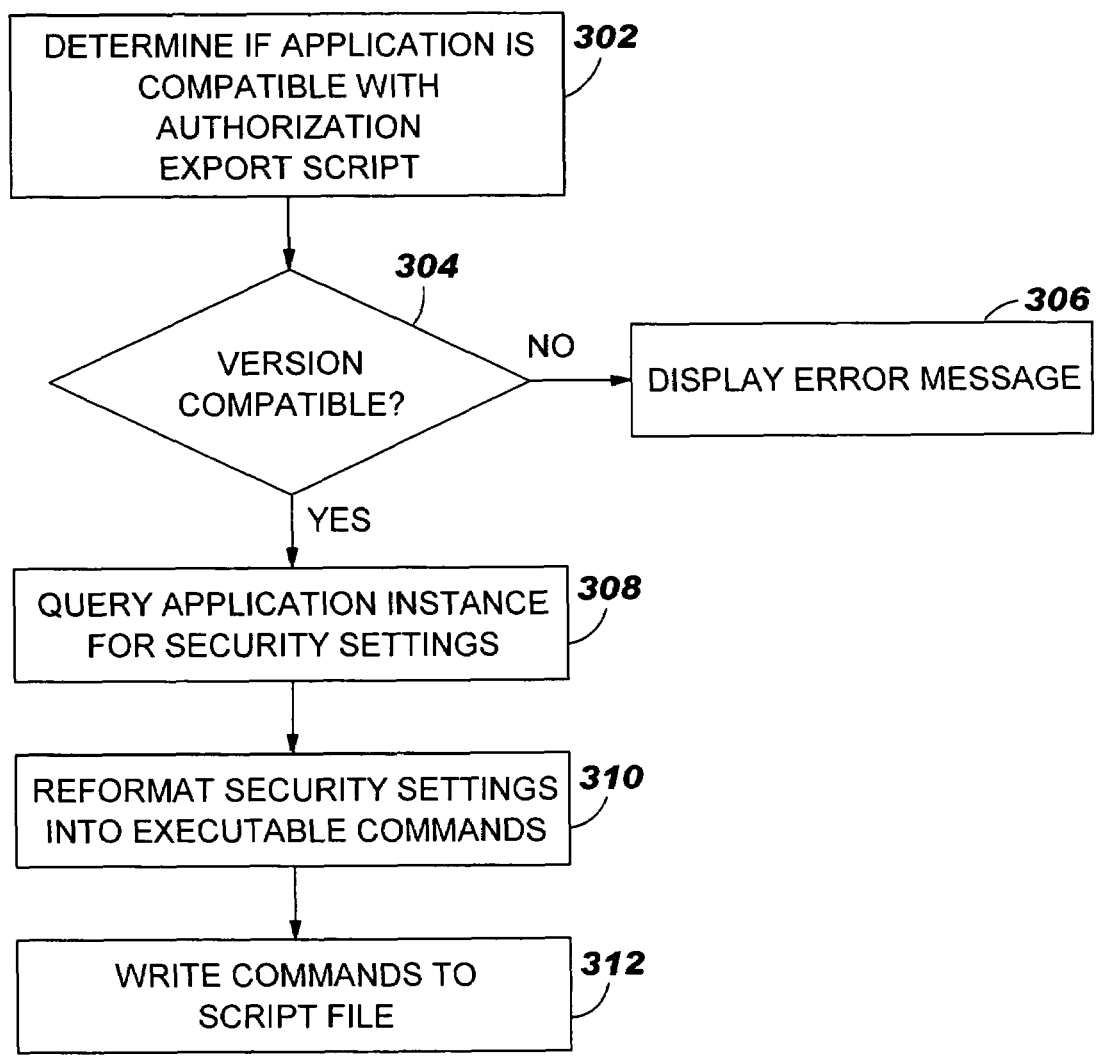
FIG. 4 is a more detailed flow chart of a script program 40 used to export authorizations, during the backup process.

FIG. 4 is a flow chart illustrating step 224 of FIG. 3 in more detail, i.e. the script program 40 to export authorizations. Initially, the script program compares the version of application 12 to a list of application versions for which the script program is compatible (step 302). If the application 12 version is not compatible (decision 304, no branch), then the script program displays an error message (step 306). However, if the application 12 version is compatible (decision 304, yes branch), then the script program queries the application instance (currently being processed) for its security settings (step 308). The application instance obtains its security settings from its own configuration file 13a,b or c (step 308, as known in the prior art). After receiving the security settings from the application instance, the script program transforms the security settings into executable commands by making a command such as "SETMQAUT" (step 310, as known in the prior art). When a security setting is to set security for a specified queue object of IBM MQ Series/Websphere MQ program to enable a specified user or group to read from or write to the queue, this command (with the appropriate specification of the security settings as command parameters) will set security for the specified queue object of IBM MQ Series/Websphere MQ program to enable the specified user or group to read from or write to the queue. Then, the script program writes these executable commands pertaining to the security settings into a script file 41 (step 312).

The foregoing backup process can be used for a variety of purposes such as recovery, migrating an application to new hardware, preparing for upgrades to the application, and replicating server application configurations across different systems.

Based on the foregoing, a system, method and program product for backing up a middleware or other program has been disclosed. However, numerous modifications and substitutions can be made without deviating from the scope of the present invention. For example, instead of the backup program 30 querying each application instance for its queue objects and authorizations, backup program 30 could request the lock for the respective repository 15a,b,c and then read the queue objects and authorizations directly from the repository 15a,b,c for the respective application instance. After reading the queue objects and authorizations form the repository 15a,b,c, the backup program 30 would return the lock so that the application instance could obtain the lock again and resume operation.

The invention claimed is:

1. A computer program product for backing up a program and a plurality of user instances of said program, said program product comprising:
    a computer readable medium;
    first program instructions to backup definitions of queues used by said plurality of user instances of said program;
    second program instructions to backup authorizations for said queues;
    third program instructions to backup a plurality of program-instance configuration files for said plurality of user instances of said program, respectively; and
    fourth program instructions to backup a configuration file for said program; and
    wherein said first, second, third and fourth program instructions are recorded on said medium in functional form.

2. A program product as set forth in claim 1 wherein said queues are message queues.

3. A program product as set forth in claim 1 further comprising fifth program instructions to backup user exits for said program and said plurality of user instances of said program; and wherein said fifth program instructions are recorded on said medium in functional form.

4. A program product as set forth in claim 1 wherein said first, second, third and fourth program instructions are executed as a continuous program flow such that said backups are substantially consistent wit each other.

5. A program product as set forth in claim 1 wherein said first program instructions request said definitions of said queues from one of said user instances of said program, and said second program instructions request said authorizations from said one user instance of said program.

6. A program product as set forth in claim 1 wherein said program is a middleware program.

7. A computer system for backing up a program and a plurality of user instances of said program, said system comprising:
    means for backing up definitions of queues used by said plurality of user instances of said program;
    means for backing up authorizations for said queues;
    means for backing up a plurality of program-instance configuration files for said plurality of program instances, respectively; and
    means for backing up a configuration file for said program.

8. A system as set forth in claim 7 wherein said queues are message queues.

9. A system as set forth in claim 7 further comprising means for backing up user exits for said program and said plurality of user instances of said program.

10. A system as set forth in claim 7 wherein all of said means are initiated at nearly a same time such that the respective backups are substantially consistent with each other.

11. A system as set forth in claim 7 wherein the queue definition backup means request said definitions of said queues from one of said user instances of said program, and the queue authorization backup means request said authorizations from said one user instance of said program.

12. A system as set forth in claim 7 wherein said program is a middleware program.

13. A method for backing up a user instance of a program which instance has locked a queue definition file containing definitions of queues and authorizations for accessing the queues, and which has not locked a configuration file identifying said instance, said method comprising the steps of:
    a backup program querying said instance for the definitions of said queues and the authorizations for said queues such that said instance retains the lock on said queue definition file, and in response, said user program reading said definitions and authorizations from said queue definition file and furnishing them to said backup program; and
    said backup program directly reading said configuration file without querying said user program for said configuration file and without locking said configuration file.

14. A method as set forth in claim 13 wherein said configuration file specifies a name and location of said user program instance.

* * * * *